US009377896B2

(12) United States Patent
Lin et al.

(10) Patent No.: US 9,377,896 B2
(45) Date of Patent: Jun. 28, 2016

(54) OPTICAL TOUCH SYSTEM AND HOVERING IDENTIFICATION METHOD THEREOF

(71) Applicant: PIXART IMAGING INC., Hsin-Chu County (TW)

(72) Inventors: Yu-Chia Lin, Hsin-Chu County (TW); Yu-Hsiang Huang, Hsin-Chu County (TW)

(73) Assignee: Pixart Imaging Inc., Hsin-Chu County (TW)

( * ) Notice: Subject to any disclaimer, the term of this patent is extended or adjusted under 35 U.S.C. 154(b) by 32 days.

(21) Appl. No.: 14/473,138

(22) Filed: Aug. 29, 2014

(65) Prior Publication Data

US 2015/0145832 A1 May 28, 2015

(30) Foreign Application Priority Data

Nov. 26, 2013 (TW) ............................ 102143176 A

(51) Int. Cl.
*G06F 3/041* (2006.01)
*G06F 3/042* (2006.01)

(52) U.S. Cl.
CPC ............ *G06F 3/0416* (2013.01); *G06F 3/0428* (2013.01); *G06F 2203/04101* (2013.01); *G06F 2203/04104* (2013.01)

(58) Field of Classification Search
CPC ..... G06F 3/0428; G06F 3/042; G06F 3/0421; G06F 3/0416
USPC ....................................... 345/175; 178/18.09
See application file for complete search history.

(56) References Cited

U.S. PATENT DOCUMENTS

2011/0050644 A1* 3/2011 Su ......................... G06F 3/0428 345/175
2011/0304587 A1* 12/2011 Tsai ...................... G06F 3/0416 345/175

FOREIGN PATENT DOCUMENTS

TW 201342158 A 10/2013

OTHER PUBLICATIONS

English Abstract of TW201342158A, Oct. 13, 2013.

* cited by examiner

*Primary Examiner* — Koosha Sharifi-Tafreshi
(74) *Attorney, Agent, or Firm* — Rosenberg, Klein & Lee

(57) ABSTRACT

An optical touch system including a touch surface, a plurality of image sensors, a calculation unit and an identification unit is provided. The touch surface is for interactive operation with an object. Each of the image sensors is configured to capture an image frame looking across the touch surface. The calculation unit is configured to calculate a coordinate of the object and an operating depth of the object corresponding to each of the image sensors according to the image frame. The identification unit is configured to increase a count value when the coordinate is within an operable range of one of the image sensors and the operating depth corresponding to the image sensor exceeds a depth threshold to accordingly perform hovering identification according to the count value.

21 Claims, 6 Drawing Sheets

| $P_0$ | 121 | 122 | 123 | 124 |
|---|---|---|---|---|
| operable sensor | Y | Y | Y | N |
| depth ≥TH0 | Y | N | Y | X |
| count value | 2 | | | |
| hover touch | 2≥THa touch ; 2<THa hover | | | |

| TH0 | TH1 | TH2 | distance1 operable no.1 |
|---|---|---|---|
| TH0 | $TH1_{low}$ | $TH2_{low}$ | operable no.2 |
| TH0 | $TH1_{high}$ | $TH2_{high}$ | distance2 |
| Offset 1 | | | merging no.1 |
| Offset 2 , N x Offset 1 | | | merging no.2 |

OPTICAL TOUCH SYSTEM AND HOVERING IDENTIFICATION METHOD THEREOF

RELATED APPLICATIONS

The present application is based on and claims priority to Taiwanese Application Number 102143176, filed Nov. 26, 2013, the disclosure of which is hereby incorporated by reference herein in its entirety.

BACKGROUND

1. Field of the Disclosure

This disclosure generally relates to an input device and, more particularly, to an optical touch system capable of identifying a small hovering height and a hovering identification method thereof.

2. Description of the Related Art

The computer software system nowadays is gradually developed to operate in cooperation with the touch control, e.g. Windows 8 system. In order to follow the development of the software, the peripheral hardware devices, such as the display screen, need to incorporate corresponding functions.

Generally, the touch panel is divided into resistive type, capacitive type and optical type touch panels according to the induction principle thereof, wherein although the optical type touch panel may perform multi-touch control, the object blocking and hovering identification are some issues. Generally speaking, when a finger is approaching but not in contact with the touch panel, a hovering state is defined. Although the hovering state may increase operable functions in addition to the touched state, however when the finger is very close to the touch panel but not actually in contact with the touch panel, the operating state may not be identifiable. Accordingly, how to increase the accuracy of hovering identification is still an issue to be solved in the optical touch panel technology.

SUMMARY

Accordingly, the present disclosure further provides an optical touch system and a hovering identification method thereof that confirm whether a touch point is a hovering touch point or a touched touch point according to image frames captured by a plurality of image sensors.

The present disclosure provides an optical touch system and a hovering identification method thereof that identify a small hovering height and adjust the depth threshold in a multi-touch control so as to increase the identification accuracy.

The present disclosure further provides an optical touch system and a hovering identification method thereof that identify a small hovering height and adjust the depth threshold according to a distance between an object and an image sensor so as to increase the identification accuracy.

The present disclosure further provides an optical touch system and a hovering identification method thereof that identify a small hovering height and adjust the depth threshold according to a number of operable image sensors associated with an object so as to increase the identification accuracy.

The present disclosure provides an optical touch system including a touch surface, a plurality of image sensors, a storage unit, a calculation unit and an identification unit. The touch surface is for at least one object operating thereupon. Each of the image sensors is configured to capture an image frame looking across the touch surface. The storage unit stores at least one depth threshold and an operable range of each of the image sensors corresponding to the touch surface. The calculation unit is configured to calculate a coordinate of each object and an operating depth of each object corresponding to each of the image sensors according to the image frame. The identification unit is configured to define the image sensor with the operable range thereof containing the coordinate of the object as an operable image sensor, accumulate a count value of the operable image sensor with the associated operating depth exceeding the depth threshold corresponding to each object, and identify a touched state when the count value exceeds a counting threshold.

The present disclosure further provides a hovering identification method of an optical touch system. The optical touch system includes a plurality of image sensors respectively configured to capture an image frame looking across a touch surface. The hovering identification method includes the steps of: calculating, using a calculation unit, a coordinate of at least one object and an operating depth of the at least one object corresponding to each of the image sensors according to the image frame; defining one of the image sensors as an operable image sensor when the coordinate is within an operable range of the one of the image sensors; comparing, using an identification unit, the operating depth of the operable image sensor associated with each object with at least one depth threshold; and identifying a hovering state of each object according to a count value of the operable image sensor with the associated operating depth exceeding the depth threshold corresponding to each object.

The present disclosure further provides an optical touch system including a touch surface, a plurality of image sensors, a calculation unit and an identification unit. The touch surface is for an object operating thereupon. Each of the image sensors is configured to capture an image frame looking across the touch surface. The calculation unit is configured to calculate a coordinate of the object and an operating depth of the object corresponding to each of the image sensors according to the image frame. The identification unit is configured to increase a count value when the coordinate is within an operable range of one of the image sensors and the operating depth corresponding to the one of the image sensors exceeds a depth threshold, and identify an operating state of the object according to the count value.

In one embodiment, the counting threshold is correlated with, e.g. positively correlated with a number of operable image sensors associated with each object.

In one embodiment, the identification unit is further configured to calculate an obstruction distance between obstructions of a plurality of objects corresponding to each of the image sensors. The storage unit stores depth thresholds corresponding to different obstruction distances. The identification unit is configured to select a suitable depth threshold according to the obstruction distance.

In one embodiment, the identification unit is further configured to calculate a merging obstruction number of obstructions of a plurality of objects corresponding to each of the image sensors. The storage unit stores depth thresholds corresponding to different merging obstruction numbers. The identification unit is configured to adjust the depth threshold according to the merging obstruction number.

In one embodiment, the depth threshold is correlated with, e.g. positively correlated with a number of operable image sensors associated with each object.

In one embodiment, the storage unit stores a plurality of depth thresholds, and the depth thresholds are different according to a distance in the operable range from the associated image sensor.

In the optical touch system and the hovering identification method according to some embodiments of the present disclosure, the identification unit firstly confirms the operable image sensors corresponding to an object and then counts the number of image sensors detecting touching or hovering in the operable image sensors. When more operable image sensors detect the touching, the object is identified as a touched state; whereas when more operable image sensors detect the hovering, the object is identified as a hovering state, wherein the number is adjustable according to a total number of the operable image sensors so as to increase the identification accuracy. Accordingly, an operating state is not identified when all the operable image sensors identify the same state.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
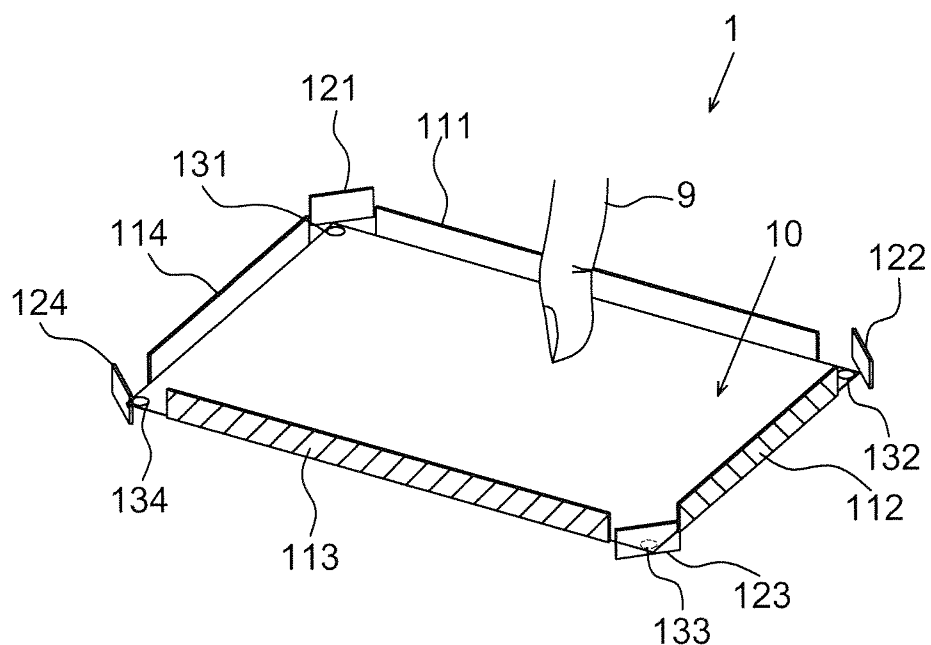
FIG. 1 is a block diagram of the optical touch system according to one embodiment of the present disclosure.
Figure 2:
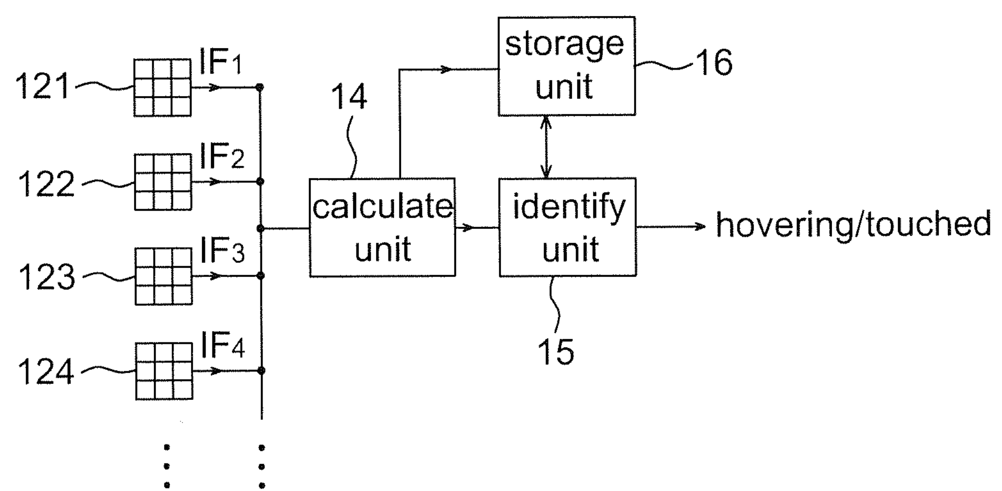
FIG. 2 is a schematic block diagram of the optical touch system according to one embodiment of the present disclosure.

Referring to FIG. 1, it is a block diagram of the optical touch system according to one embodiment of the present disclosure. The optical touch system 1 of this embodiment includes a touch surface 10, a plurality of reflective bars (e.g. four reflective bars 111 to 114 shown herein) and a plurality of image sensors (e.g. four image sensors 121 to 124 shown herein), wherein the number and arrangement of the image sensors and the reflective bars are determined according to different applications and not limited to those shown in FIG. 1. The optical touch system 1 is configured to distinguish a hovering operating state and a touched operating state of at least one object (for example, but not limited to, at least one finger) upon the touch surface 10, and to control an electronic device to execute different operations according to different operating states, wherein functions that an electronic device operates according to different operating states are well known and thus are not described herein.

The reflective bars 111 to 114 are respectively disposed at edges of the touch surface 10 so as to define an operating region on the touch surface 10, and configured to reflect ambient light or light emitted by the system light source. In one embodiment, the optical touch system 1 includes at least one system light source (e.g. four system light sources 131 to 134 shown herein) configured to illuminate the reflective bars 111 to 114, wherein the system light source is the non-coherent light source (e.g. light emitting diode) or the partial coherent light source and emits invisible light. It should be mentioned that although FIG. 1 shows that the system light sources 131 to 134 are respectively disposed adjacent to the image sensors 121 to 124, it is not to limit the present disclosure. According to different applications, the disposed position, number and emission spectrum of the system light source may be different without particular limitation. In addition, the system light source emits light at a lighting frequency identical to or different from an image capturing frequency of the image sensors 121 to 124, and different system light sources illuminate in different time intervals corresponding to the image capturing of the associated image sensor.

The image sensors 121 to 124 respectively include, for example a CCD image sensor, a CMOS image sensor or the like. The image sensors 121 to 124 are respectively configured to capture an image frame looking across the touch surface 10 at identical or different times, and the image frame includes at least one reflective bar image. When at least one object 9 approaches or contacts the touch surface 10, each of the image sensors 121 to 124 captures the image frame of the object 9 blocking the associated reflective bar in the field of view thereof. It should be mentioned that although the image sensors 121 to 124 are shown to be arranged at four corners of the touch surface 10 in FIG. 1, it is not to limit the present disclosure. In one embodiment, the optical touch system 1 further includes two image sensors arranged at a side of the reflective bar 111 or 113.

Referring to FIG. 1 it is a schematic block diagram of the optical touch system according to one embodiment of the present disclosure. In addition to the image sensors 121 to 124 (e.g. sensing array shown herein), the optical touch system 1 of this embodiment further includes a calculation unit 14, an identification unit 15 and a storage unit 16. In this embodiment, the calculation unit 14, identification unit 15 and storage unit 16 may be implemented as a control chip by the software, hardware, firmware or the combination thereof without particular limitation.

As mentioned above, the image sensors 121 to 124 capture and output image frames $IF_1$ to $IF_4$ simultaneously or time-divisionally. The calculation unit 14 is configured to calculate a coordinate of each object and an operating depth of each object corresponding to each image sensor (illustrated with an example below) according to the image frames $IF_1$ to $IF_4$; i.e. the calculation unit 14 respectively obtaining one operating depth according the image frame of each image sensor corresponding to each object, e.g. 4 operating depths of each object herein. The identification unit 15 is configured to define the image sensor with an operable range thereof containing the coordinate of the object as an operable image sensor, accumulate a count value of the operable image sensor with the associated operating depth exceeding at least one depth threshold corresponding to each object, and identify a touched state when the count value exceeds a counting threshold. In addition, the identification unit 15 further calculates an obstruction distance and/or a merging obstruction number to accordingly select and adjust the depth threshold so as to increase the identification accuracy. The storage unit 16 previously stores at least one depth threshold, at least one counting threshold and an operable range of each image sensor with respect to the touch surface 10.

Figure 3:
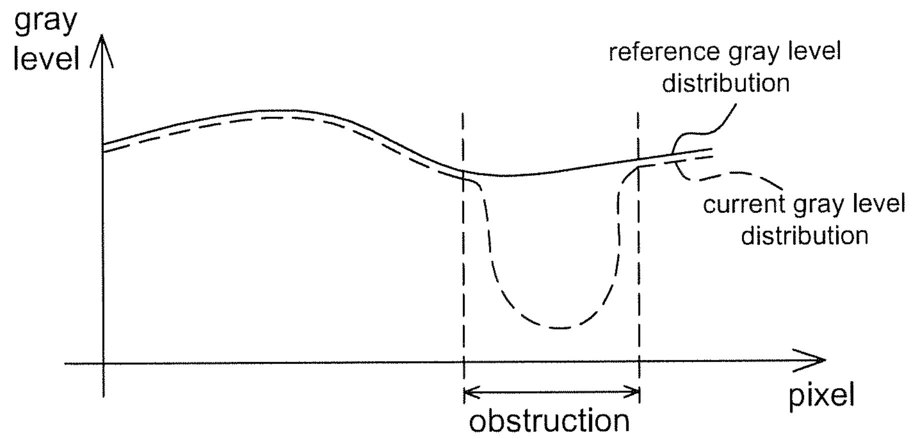
FIG. 3 is a schematic diagram of calculating the operating depth of an object in the optical touch system according to one embodiment of the present disclosure.

Firstly, the method of calculating an operating depth of each object corresponding to each image sensor by the calculation unit 14 according to the image frames $IF_1$ to $IF_4$ is illustrated. Referring to FIG. 3, in a startup procedure, each image sensor captures an image frame to be served a reference image frame, wherein preferably the reference image frame does not contain any object image. If a sum or average of every column of gray levels of the reference image frame is calculated. a one-dimensional reference gray level distribution (e.g. show as the solid line) is obtained, wherein the one-dimensional reference gray level distribution is stored in the storage unit 16. During operation, each image sensor captures an image frame to be served as a current image frame, wherein it is assumed that the current image frame includes an object image (e.g. the deep shown in FIG. 3). Similarly, a one-dimensional current gray level distribution is obtained by calculating a sum or average of every column of gray levels of the current image frame (e.g. shown as the dashed line). It should be mentioned that the reference gray level distribution and the current gray level distribution are substantially identical outside the obstruction region in FIG. 3, but for illustration purpose the two distributions are shown by two separated curves.

In the present disclosure, the operating depth of the object corresponding to an image sensor is calculated by equation (1)

$$\text{depth}=\max \text{ of}(Ri-Ci)/Ri,\ i=1 \text{ to } n \quad (1)$$

In equation (1), Ri indicates each gray level of the one-dimensional reference gray level distribution of the reference image frame; Ci indicates each gray level of the one-dimensional current gray level distribution of the current image frame; and n is the one-dimensional size of the image frame (e.g. the resolution herein). In the present disclosure, the operating depth is defined as a maximum value of equation (1) and the object position is defined as a pixel position having the maximum value. It is known from equation (1) that if the object is closer to the touch surface 10, the operating depth has a higher value, wherein when the object does not enter a field of view of the image sensor, the operating depth is 0; whereas when the object is in contact with the touch surface 10, the operating depth is 1. In addition, when calculating the operating depth, gray levels of the whole one-dimensional gray level distribution is calculated by equation (1); or an obstruction range is firstly calculated according to the one-dimensional reference gray level distribution and the one-dimensional current gray level distribution and then the gray levels within the obstruction range are calculated by equation (1). It should be mentioned that in the present disclosure the method of calculating the operating depth is not limited to equation (1). For example, in one embodiment the denominator in equation (1) is cancelled and only the difference of gray levels is calculated. In another embodiment, the operating depth may be an average value of equation (1) averaged by n. In other words, the operating depth is obtainable according to one-dimensional gray level distributions of a reference image frame and a current image frame.

Next, the method of determining an operable range of each image sensor with respect to the touch surface 10 is illustrated. In the present disclosure, the operable range may be previously calculated and stored in the storage unit 16 before shipment of the optical touch system 1.

Figure 4A:
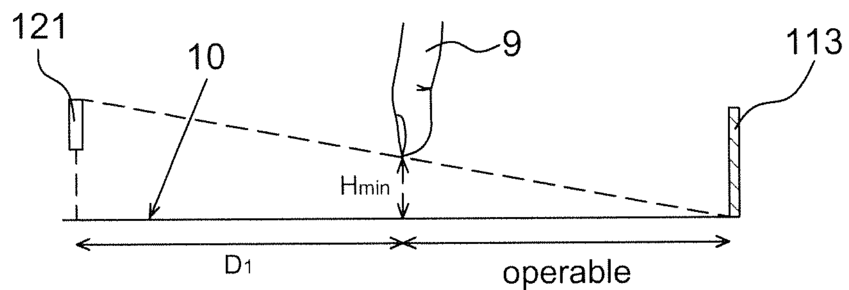
FIGS. 4A to 4B are schematic diagrams of determining the operable range in the optical touch system according to one embodiment of the present disclosure.
Figure 4B:
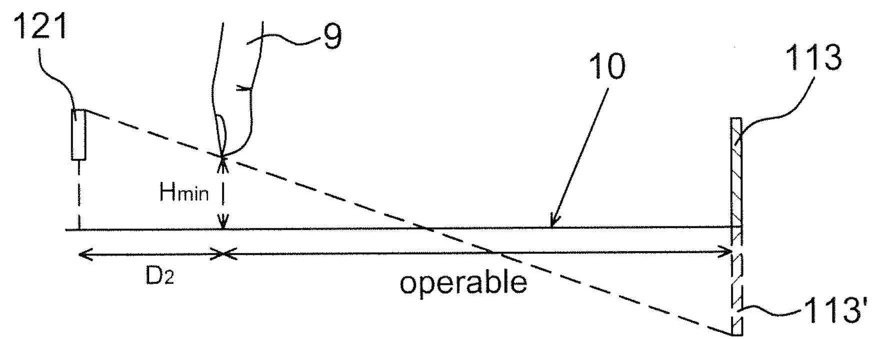

Referring to FIGS. 4A and 4B, FIG. 4A is an operational schematic diagram in which the touch surface 10 is a non-mirror surface; whereas FIG. 4B is an operational schematic diagram in which the touch surface 10 is a mirror surface, wherein only the image sensor 121 and the reflective bar 113 are taken as an example for illustration herein. The operation of other image sensors and reflective bars are similar.

It is known from FIG. 4A, when there is no object approaching the touch surface 10, the image sensor 121 captures the whole reflective bar image of the reflective bar 113. Herein it is assumed that a detectable minimal hovering height of the system is Hmin, e.g. 1 mm. As shown in equation (1), in calculating the operating depth, at least a part of the reflective bar image is captured by the image sensor 121. When the object 9 is at a predetermined distance from the image sensor 121, the image of the reflective bar 113 is not detectable by the image sensor 121 even though the object 9 is not in contact with the touch surface 10, and thus a region within the predetermined distance is not an operable range corresponding to the image sensor 121 and becomes a blind region. Accordingly, in the present disclosure, the blind region is determined by keeping the object at the detectable minimal hovering height Hmin and approaching the object to the image sensor 121 till the image sensor 121 is unable to capture the image of the reflective bar 113, i.e. at the predetermined distance D1, and the range outside the predetermined distance D1 is defined as an operable range of the image sensor 121. It is known from FIG. 4A that the predetermined distance D1 is determined according to the detectable minimal hovering height Hmin and the image resolution. For example, if a smaller reflective bar image is recognizable by the image sensor 121, the blind region is decreased. In addition, when the reflective bar 113 is not directly disposed on the touch surface 10 but separated by a distance therefrom, the blind region is increased. In other words, the blind region is determined according to the system parameter and the detectable minimal hovering height Hmin.

As shown in FIG. 4B, in order to reduce the blind region so as to increase the operable range, the touch surface 10 may use a mirror surface and thus the image sensor 121 captures the real image of reflective bar 113 and the virtual image of reflective bar 113'. In this manner, as long as the image sensor 12 captures a part of the virtual image of reflective bar 113', the calculation unit 14 is able to calculate the operating depth according to equation (1) such that the blind region is significantly decreased and the operable range is increased, i.e. D2<D1.

Figure 5A:
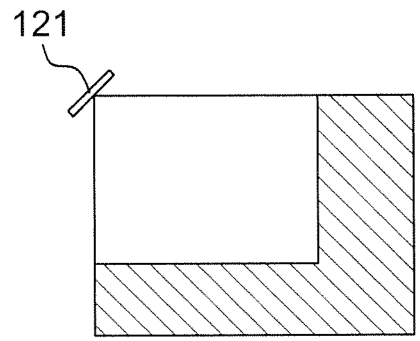
FIGS. 5A to 5E are schematic diagrams of operable ranges of the optical touch system according to one embodiment of the present disclosure.
Figure 5B:
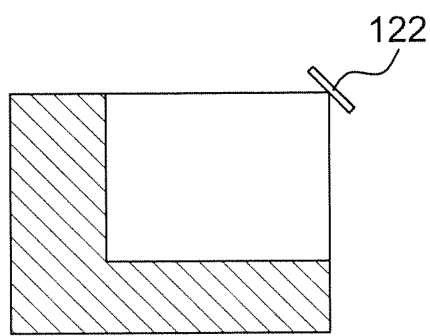
Figure 5C:
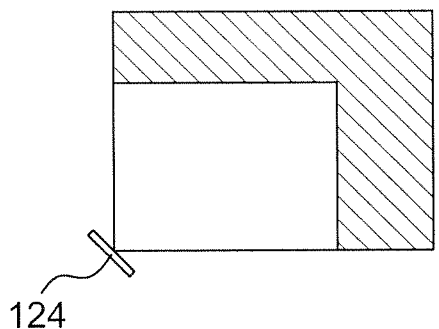
Figure 5D:
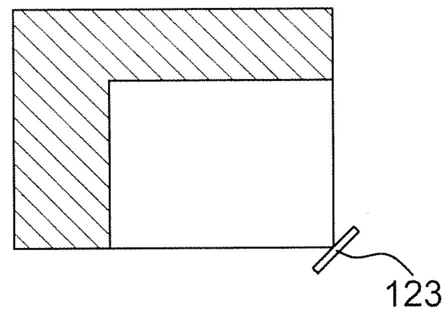
Figure 5E:
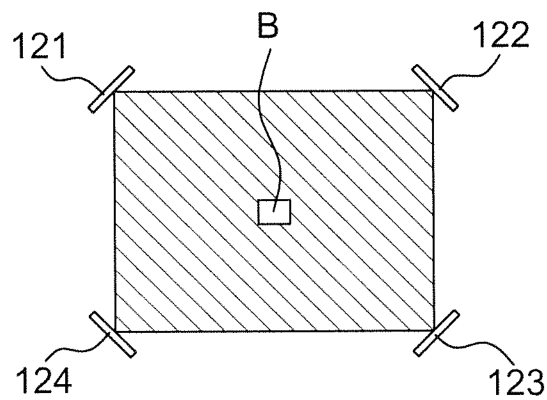

According to the above method, before the shipment of the optical touch system 1, it is able to calculate an operable range corresponding to each image sensor, e.g. the region filled with slant lines in FIGS. 5A to 5D. FIG. 5E shows the overlapping of the operable ranges of FIGS. 5A to 5D on the touch surface 10. For illustration purpose, FIG. 5E shows a blind region B. When an object is located within the blind region B, all image sensors 121 to 124 are unable to detect the operating state of the object. Accordingly, preferably no blind region exists on the touch surface 10 in designing a system.

Figures 6, 7:
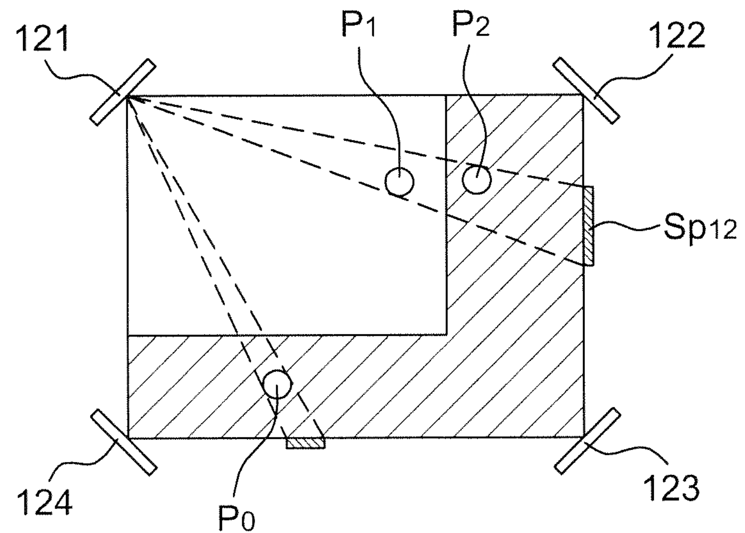
FIG. 6 is an operational schematic diagram of the optical touch system according to one embodiment of the present disclosure.
FIG. 7 shows the detected information corresponding to an object in the optical touch system according to one embodiment of the present disclosure.

Referring to FIG. 6, one embodiment of the identification unit 15 identifying the operating state of an object is illustrated. Herein it is assumed that a single object P0 is for being captured by the image sensors 121 to 124. The image sensors 121 to 124 respectively capture and output an image frame $IF_1$ to $IF_4$ to the calculation unit 14.

The calculation unit 14 calculates a coordinate of the single object P0 with respect to the touch surface 10 according to the image frames $IF_1$ to $IF_4$, wherein the method of calculating the coordinate of an object according to image frames captured by a plurality of image sensors are well known, e.g. mapping field of views of the plurality of image sensors to a two-dimensional space with respect to the touch surface 10 and then calculating the object coordinate with respect to the two-dimensional space according to the image frames. The calculation unit 14 further calculates an operating depth of the object P0 corresponding to each of the image sensors 121 to 124 according to the image frames $IF_1$ to $IF_4$ as well as equation (1). The calculation unit 14 also transmits information of the coordinate and the operating depth to the identification unit 15.

The identification unit 15 identifies whether the coordinate is within the operable ranges of the image sensors 121 to 124 at first, e.g. FIG. 6 showing that the coordinate of the object P0 is within the operable range of the image sensor 121. Referring to FIG. 7, it is assumed that the identification unit 15 identifies that the coordinate of the object P0 is respectively within the operable ranges of the image sensors 121 to 123 (shown by "Y") but not within the operable range of the image sensor 124 (shown by "N") such that the image sensors 121 to 123 are defined as operable image sensors corresponding to the object P0 but the image sensor 124 is not defined as an operable image sensor corresponding to the object P0.

Next, the identification unit 15 compares the operating depth of the object P0 corresponding to each of the image sensors 121 to 123 with a depth threshold TH0 which is previously stored in the storage unit 16, wherein the operating depth corresponding to the image sensor 124 is not compared. Assuming the identification unit 15 obtains that operating depths of the object P0 corresponding to the image sensors 121 and 123 exceed the operating threshold TH0 (shown by "Y") but an operating depth of the object P0 corresponding to the image sensor 122 is smaller than the operating threshold TH0 (shown by "N") herein. Accordingly, the identification unit 15 is configured to increase a count value when the coordinate is within an operable range of one of the image sensors and the operating depth corresponding to the one of the image sensors exceeds a depth threshold, i.e. increasing the count value by 1 when the second and third rows in FIG. 7 show "Y" at the same time, e.g. the count value being shown as 2 herein. In other words, the identification unit 15 identifies that the object P0 is the touched state corresponding to the image sensors 121 and 123 but is not the touched state corresponding to the image sensors 122 and 124. It should be mentioned that the value and state shown in FIG. 7 are only intended to illustrate but not to limit the present disclosure.

Finally, the identification unit 15 identifies an operating state of the object P0 according to the count value. For example, when the count value exceeds a counting threshold THa, the identification unit 15 identifies that the object P0 is a touched state corresponding to the optical touch system 1; whereas when the count value does not exceed the counting threshold THa, the identification unit 15 identifies that the object P0 is a hovering state corresponding to the optical touch system 1. More specifically, in order to increase the identification accuracy in a small hovering distance condition, the identification unit 15 identifies the operating state of an object according to overall results of all image sensors. The touched state of the object P0 is identified when a number of image sensors identifying the touched state exceeds a predetermined number but not identified according to the detected result of a single image sensor.

Figure 8:
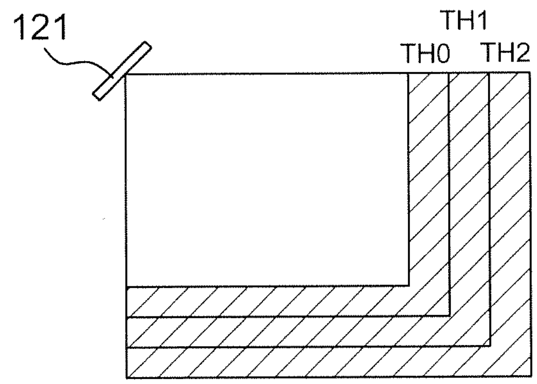
FIG. 8 is a schematic diagram of different depth thresholds of the optical touch system according to one embodiment of the present disclosure.

In addition, due to the influence of the modulation transfer function (MTF) of the lens of the image sensor, when the object is at the same height from the touch surface 10 and farther from the image sensor, the calculation unit 14 may obtain a smaller operating depth, e.g. according to equation (1). Accordingly, in order to increase the identification accuracy, the depth threshold TH0 is different according to a distance in an operable range from the associated image sensor. Referring to FIG. 8, for example the storage unit 16 stores a plurality of depth thresholds (e.g. TH0 to TH2), wherein the depth thresholds are different according to a distance in the operable range (e.g. the region filled with slant lines) from the image sensor 121. In this embodiment, the farther the distance from the image sensor 121 is, the smaller depth threshold is selected, e.g. TH0>TH1>TH2. It is appreciated that the number of depth thresholds is not limited to 3, which may be determined according to the size of the touch surface 10 and the system requirement.

As mentioned above, as the identification unit 15 identifies the operating state of an object according to the overall results of all image sensors, when the number of the operable image sensors corresponding to an object is lower, the countable count value is relatively less since the depth information not belonging to the operable image sensor is not considered. Accordingly, to avoid errors, the counting threshold THa may be positively correlated with a number of the operable image sensors associated with each object. That is, when the number of the operable image sensors is higher, the higher counting threshold THa is selected; whereas when the number of the operable image sensors is lower, the lower counting threshold THa is selected. In other words, the storage unit 16 previously stores different counting thresholds THa, and the identification unit 15 selects the suitable counting threshold THa according to the number of the operable image sensors associated with each object so as to increase the identification accuracy.

Figures 11, 12:
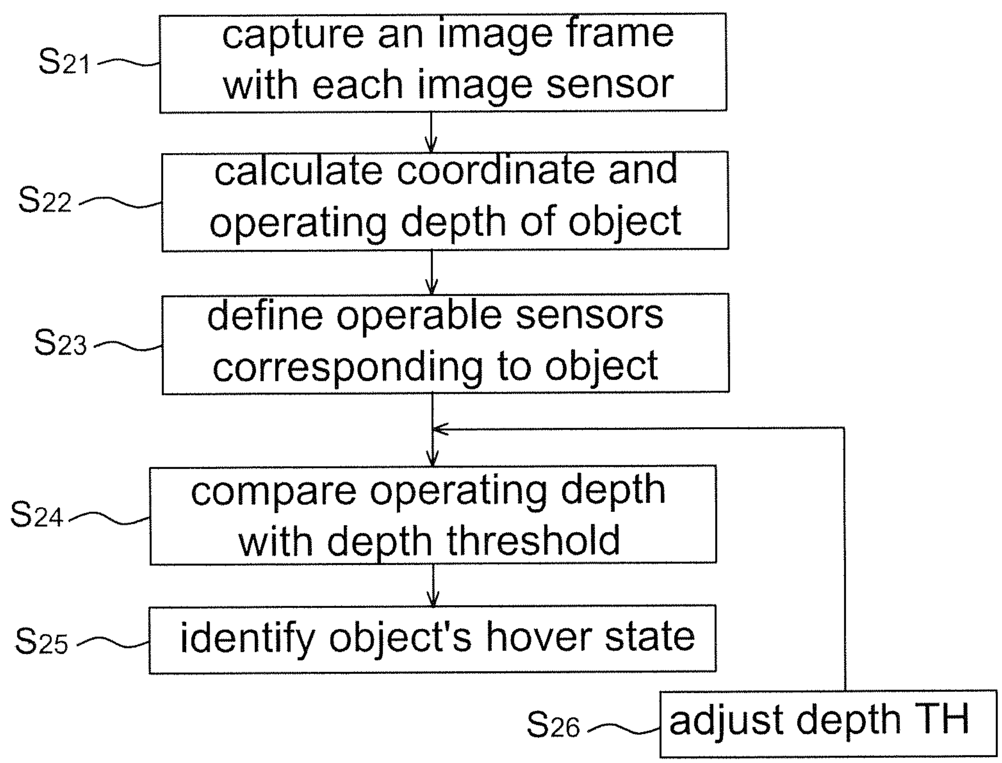
FIG. 11 shows different depth thresholds previously stored in the storage unit of the optical touch system according to one embodiment of the present disclosure.
FIG. 12 is a flow chart of the hovering identification method of the optical touch system according to one embodiment of the present disclosure.

Similarly, when the number of the operable image sensors corresponding to each object is lower, the depth threshold TH0 may be positively correlated with a number of the operable image sensors associated with each object. That is, when the number of the operable image sensors is higher, the higher depth threshold TH0 is selected; whereas when the number of the operable image sensors is lower, the lower depth threshold TH0 is selected. In other words, the storage unit 16 previously stores different depth thresholds. For example, FIG. 11 shows that the storage unit 16 stores a first set of depth thresholds TH0, TH1 and TH2 and a second set of depth thresholds TH0, $TH1_{low}$ and $TH2_{low}$, wherein $TH1>TH1_{low}$ and $TH2>TH2_{low}$. When the number of the operable image sensors corresponding to each object is higher, the first set of depth thresholds is selected; whereas when the number of the operable image sensors corresponding to each object is lower, the second set of depth thresholds is selected.

In addition, when a plurality of objects (e.g. objects P1 and P2 in FIG. 6) is for being captured by the image sensors 121 to 124, the optical touch system 1 identifies operating states of each of the objects P1 and P2 according to the above steps regarding a single object. For example, after receiving the image frames $IF_1$ to $IF_4$, the calculation unit 14 respectively calculates a coordinate of each object (P1 and P2) and an operating depth of each object corresponding to each of the image sensors (121 to 124) according to the image frames $IF_1$ to $IF_4$, e.g. 2 coordinates and 8 operating depths herein. The identification unit 15 constructs the detected information as shown in FIG. 7 of each of the objects P1 and P2 so as to indicate the operable image sensors (i.e. the coordinate within the operable range), the count value of the operable image sensors detecting the touching (i.e. operable image sensors with the associated operating depth larger than the depth threshold) and the operating state (i.e. comparing the count value with the counting threshold) of both objects P1 and P2. In other words, a number of the constructed detected information (i.e. FIG. 7) is identical to a number of the objects.

In addition, to avoid errors, when a plurality of objects is captured by the image sensors 121 to 124 and when at least one of the plurality of objects of a merging obstruction corresponding to an identical image sensor is outside of the operable range of said identical image sensor, said identical image sensor is not defined as an operable image sensor corresponding to the objects. For example in FIG. 6, the objects P1 and P2 generate a merging obstruction $S_{P12}$ corresponding to the image sensor 121, and the object P1 locates outside of the operable range of the image sensor 121 and the object P2 locates within the operable range of the image sensor 121. The image sensor 121 is not defined as an operable image sensor corresponding to the objects P1 and P2 by the identification unit 15 in constructing the detected information as shown in FIG. 7.

Figure 9:
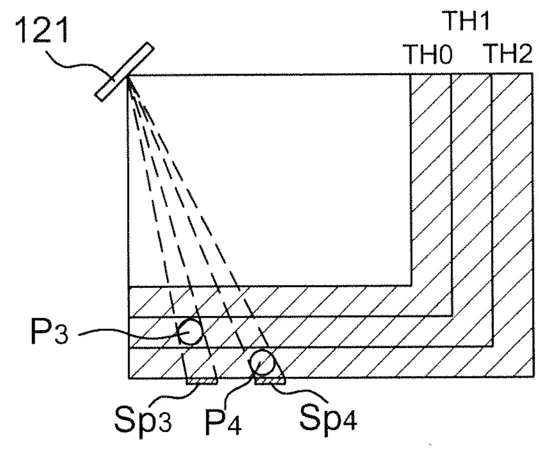
FIGS. 9 to 10 are other operational schematic diagrams of the optical touch system according to one embodiment of the present disclosure.

Referring to FIG. 9, due to the influence of the modulation transfer function of the lens of the image sensor, when the obstructions of two objects are close to each other, the operating depth calculated by the calculation unit 14 increases. Accordingly, in order to increase the identification accuracy, the identification unit 15 further calculates an obstruction distance between obstructions of a plurality of objects corresponding to each image sensor, e.g. a distance between the obstruction $S_{P3}$ associated with an object P3 and the obstruction $S_{P4}$ associated with an object P4. The storage unit 16 stores depth thresholds corresponding to different obstruction distances. For example, FIG. 11 shows the storage unit 16 is stored with a first set of depth thresholds TH0, TH1 and TH2 and a third set of depth thresholds TH0, $TH1_{high}$ and $TH2_{high}$, wherein $TH1_{high}$>TH1 and $TH2_{high}$>TH2. When the obstruction distance is larger than or equal to a distance threshold, the first set of depth thresholds is selected; whereas when the obstruction distance is smaller than the distance threshold, the third set of depth thresholds is selected so as to eliminate the influence of the modulation transfer function of the lens.

Figure 10:
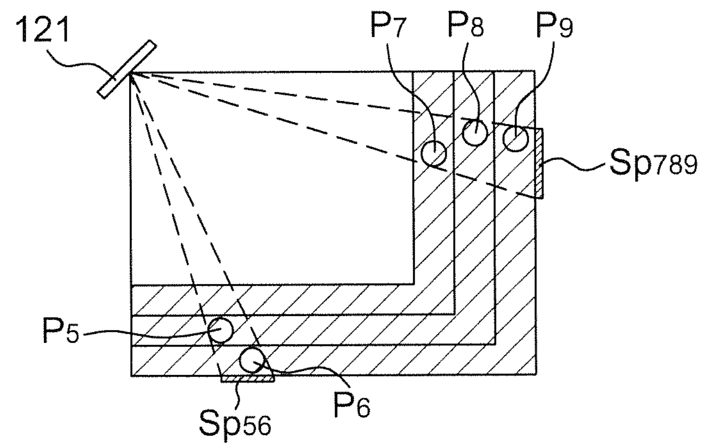

Referring to FIG. 10, when an obstruction distance between obstructions of a plurality of objects corresponding to each image sensor becomes small enough to form a merging obstruction, also due to the influence of the modulation transfer function of the lens, the calculated operating depth by the calculation unit 14 is further increased. When the identification unit 15 identifies there exists the merging obstruction, the depth threshold is further adjusted. Accordingly, the identification unit 15 further calculates a merging obstruction number of obstructions of a plurality of objects corresponding to each image sensor to accordingly adjust the depth threshold. When the merging obstruction number is higher, the adjusted scale becomes larger. For example, the objects P5 and P6 generate a merging obstruction $S_{P56}$ relative to the image sensor 121, and the objects P7 to P9 generate a merging obstruction $S_{P789}$ relative to the image sensor 121. When the identification unit 15 is identifying the operating state of the objects P5 and P6, the depth thresholds TH0, $TH1_{high}$ and $TH2_{high}$ are further adjusted upward to TH0, $TH1_{high}$+offset1 and $TH2_{high}$+offset1. When the identification unit 15 is identifying the operating state of the objects P7 to P9, the depth thresholds TH0, $TH1_{high}$ and $TH2_{high}$ are further adjusted upward to TH0, $TH1_{high}$+offset2 and $TH2_{high}$+offset2 or to TH0, $TH1_{high}$+N×offset1 and $TH2_{high}$+N×offset1 so as to eliminate the influence of the modulation transfer function of the lens.

In the above embodiment, only the smaller two depth thresholds in a set of depth thresholds are adjusted and this is because the depth threshold TH0 is originally set close to the detectable minimal hovering height Hmin and thus no adjustment is necessary. However, in other embodiments, based on the original values being set, all depth thresholds are adjustable.

Referring to FIG. 12, it is a flow chart of the hovering identification method of the optical touch system according to one embodiment of the present disclosure, which includes the steps of: capturing an image frame with each image sensor (Step $S_{21}$); calculating, using a calculation unit, a coordinate of at least one object and an operating depth of the at least one object corresponding to each of the image sensors according to the image frame (Step $S_{22}$); defining one of the image sensors as an operable image sensor when the coordinate is within an operable range of the one of the image sensors (Step $S_{23}$); comparing, using an identification unit, the operating depth of the operable image sensor associated with each of the object with at least one depth threshold (Step $S_{24}$); and identifying a hovering state of each of the object according to a count value of the operable image sensor with the associated operating depth exceeding the depth threshold corresponding to each of the object (Step $S_{25}$). As mentioned above, as different conditions of the obstructions may influence the operating depth obtained by the calculation unit 14, a step $S_{26}$ of adjusting the depth threshold may further be included. In addition, as the storage unit 16 stores a plurality of depth thresholds associated with the distance within the operable range (as shown in FIG. 8), in the comparing of Step $S_{24}$, the identification unit 15 firstly selects the depth threshold according to a distance of the coordinate of the object in an operable range from the associated image sensor and then performs the comparing.

Referring to FIGS. 1-2, 6-10 and 12, the hovering identification method according to one embodiment is illustrated hereinafter.

Step $S_{21}$: The image sensors 121 to 124 respectively capture an image frame $IF_1$ to $IF_4$ to be transmitted to the calculation unit 14.

Step $S_{22}$: The calculation unit 14 then calculates the coordinate of at least one object and an operating depth, e.g. using equation (1), of at least one object corresponding to each of the image sensors 121 to 124 according to the image frames $IF_1$ to $IF_4$. As mentioned above, the calculation unit 14 obtains one coordinate and a plurality of operating depths corresponding to each object, wherein a number of the operating depths is identical to a number of the image sensors. The coordinate and the operating depths are transmitted to the identification unit 15.

Steps $S_{23}$ to $S_{24}$: When an object (e.g. the object P0 in FIG. 6) is within the operable range of an image sensor (e.g. the image sensor 121 in FIG. 6), the image sensor 121 is defined as an operable image sensor corresponding to the object P0. The operating depths of the object P0 associated with the operable image sensors (e.g. image sensors 121, 122 and 123 in FIG. 7) are compared with at least one depth threshold and the detected information corresponding to the object P0 as FIG. 7 is constructed. When a plurality of objects exists, e.g. objects P1 and P2 in FIG. 6, objects P3 and P4 in FIG. 9, and objects P5 to P9 in FIG. 10, the identification unit 15 constructs the detected information as FIG. 7 with respect to every object by using identical way.

Step $S_{25}$: The identification unit 15 compares, corresponding to each object, the count value and the counting threshold so as to identify an operating state of each object respectively, wherein as mentioned above the count value is a number of the operable image sensors associated with an object having the operating depth exceeding the depth threshold. For example, when the count value associated with an object exceeds a counting threshold, the object is identified as a touched state corresponding to optical touch system; whereas when the count value associated with the object does not exceed the counting threshold, the object is identified as a hovering state corresponding to optical touch system as shown in FIG. 7.

Step $S_{26}$: The identification unit 15 calculates an obstruction distance between obstructions of a plurality of objects corresponding to each image sensor. When the obstruction distance does not exceed a distance threshold, one or a set of higher depth thresholds is selected, e.g. TH0, TH$\mathbf{1}_{high}$ and TH$\mathbf{2}_{high}$ in FIG. 11. When the obstruction distance exceeds a distance threshold, one or a set of lower depth thresholds is selected, e.g. TH0, TH1 and TH2 in FIG. 11. In addition, the identification unit 15 calculates a merging obstruction number of obstructions of a plurality of objects corresponding to each image sensor to further adjust the at least one depth threshold according to the merging obstruction number, e.g. adding offset1, N×offset1 or offset2 shown in FIG. 11 to the depth threshold. In addition, the identification unit 15 also selects one or a set of depth thresholds according to the number of operable image sensors corresponding to each object.

As the optical touch system 1 according to the embodiment of the present disclosure identifies the hovering state according to the overall results and adjusts the depth threshold and the counting threshold according to the image sensors actually being captured, higher identification accuracy is achieved.

It should be mentioned that it is possible to store a part of the depth thresholds shown in FIG. 11 in the storage unit 16 according to different applications.

As mentioned above, the conventional optical touch panel is still difficult to distinguish a touched state and a hovering state. Therefore, the present disclosure further provides an optical touch system capable of identifying a small hovering height (FIGS. 1 and 2) and a hovering identification method thereof (FIG. 12) that is able to determine the operating state according to previously set depth threshold and images captured by a plurality of image sensors and finely adjust the depth threshold and the counting threshold according to the operating condition so as to increase the identification accuracy.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An optical touch system, comprising:
- a touch surface for at least one object operating thereupon;
- a plurality of image sensors, each of the image sensors being configured to capture an image frame looking across the touch surface; and
- a control chip electrically coupled to the image sensors and configured to
  - store at least one depth threshold and an operable range of each of the image sensors corresponding to the touch surface,
  - calculate a coordinate of each of the object and an operating depth of each of the object corresponding to each of the image sensors according to the image frame,
  - define the image sensor with the operable range thereof containing the coordinate of the object as an operable image sensor,
  - accumulate a count value of the operable image sensor with the associated operating depth exceeding the depth threshold corresponding to each of the object, and
  - identify a touched state when the count value exceeds a counting threshold.

2. The optical touch system as claimed in claim 1, wherein the counting threshold is positively correlated with a number of the operable image sensor associated with each of the object.

3. The optical touch system as claimed in claim 1, wherein the control chip is further configured to
- calculate an obstruction distance between obstructions of a plurality of objects corresponding to each of the image sensors, and
- store depth thresholds corresponding to different obstruction distances.

4. The optical touch system as claimed in claim 1, wherein the control chip is further configured to calculate a merging obstruction number of obstructions of a plurality of objects corresponding to each of the image sensors to accordingly adjust the depth threshold.

5. The optical touch system as claimed in claim 1, wherein the depth threshold is positively correlated with a number of the operable image sensor associated with each of the object.

6. The optical touch system as claimed in claim 1, wherein the control chip is configured to store a plurality of depth thresholds, and the depth thresholds are different according to a distance in the operable range from the associated image sensor.

7. The optical touch system as claimed in claim 1, wherein when the coordinate of at least one of a plurality of objects of a merging obstruction corresponding to an identical image sensor is outside of the operable range of the identical image sensor, the identical image sensor is not defined as an operable image sensor corresponding to the objects.

8. The optical touch system as claimed in claim 1, wherein the operating depth is obtained according to one-dimensional gray level distributions of a reference image frame and a current image frame.

9. The optical touch system as claimed in claim 1, wherein the touch surface is a mirror surface or a non-mirror surface.

10. The optical touch system as claimed in claim 1, further comprising a plurality of reflective bars and at least one system light source, the reflective bars being respectively disposed at edges of the touch surface and the system light source being configured to illuminate the reflective bars, wherein the image frames captured by the image sensors contain at least one reflective bar image.

11. The optical touch system as claimed in claim 1, wherein the operable range is determined according to a detectable minimal hovering height.

12. A hovering identification method of an optical touch system, the optical touch system comprising a plurality of image sensors respectively configured to capture an image frame looking across a touch surface, the hovering identification method comprising:
- calculating, using a calculation unit, a coordinate of at least one object and an operating depth of the at least one object corresponding to each of the image sensors according to the image frame;

defining one of the image sensors as an operable image sensor when the coordinate is within an operable range of the one of the image sensors;

comparing, using an identification unit, the operating depth of the operable image sensor associated with each of the object with at least one depth threshold; and identifying a hovering state of each of the object according to a count value of the operable image sensor with the associated operating depth exceeding the depth threshold corresponding to each of the object.

13. The hovering identification method as claimed in claim 12, further comprising:

calculating an obstruction distance between obstructions of a plurality of objects corresponding to each of the image sensors; and selecting the depth threshold according to the obstruction distance.

14. The hovering identification method as claimed in claim 12, further comprising:

calculating a merging obstruction number of obstructions of a plurality of objects corresponding to each of the image sensors; and adjusting the depth threshold according to the merging obstruction number.

15. The hovering identification method as claimed in claim 12, wherein the calculation unit is configured to calculate the operating depth according to one-dimensional gray level distributions of a reference image frame and a current image frame.

16. The hovering identification method as claimed in claim 12, further comprising:

identifying a touched state of an object when the count value associated with the object exceeds a counting threshold; and identifying the hovering state of an object when the count value associated with the object does not exceed the counting threshold.

17. The hovering identification method as claimed in claim 12, wherein the counting threshold is positively correlated with a number of the operable image sensor associated with each of the object.

18. The hovering identification method as claimed in claim 12, further comprising:

selecting the depth threshold according to a distance in the operable range from the associated image sensor.

19. The hovering identification method as claimed in claim 12, wherein when the coordinate of at least one of a plurality of objects of a merging obstruction corresponding to an identical image sensor is outside of the operable range of the identical image sensor, the identical image sensor is not defined as an operable image sensor corresponding to the objects.

20. An optical touch system, comprising:

a touch surface for an object operating thereupon;

a plurality of image sensors, each of the image sensors being configured to capture an image frame looking across the touch surface; and a control chip electrically coupled to the image sensors and configured to calculate a coordinate of the object and an operating depth of the object corresponding to each of the image sensors according to the image frame, increase a count value when the coordinate is within an operable range of one of the image sensors and the operating depth corresponding to the one of the image sensors exceeds a depth threshold, and identify an operating state of the object according to the count value.

21. The optical touch system as claimed in claim 20, wherein the depth threshold is different according to a distance in the operable range from the associated image sensor.

* * * * *